United States Patent
Power

(10) Patent No.: US 10,924,579 B2
(45) Date of Patent: Feb. 16, 2021

(54) SYSTEM AND METHOD FOR METRO MID-TIER MAPPING IN A CONTENT DELIVERY NETWORK

(71) Applicant: Level 3 Communications, LLC, Broomfield, CO (US)

(72) Inventor: William R. Power, Boulder, CO (US)

(73) Assignee: Level 3 Communications, LLC, Broomfield, CO (US)

(*) Notice: Subject to any disclaimer, the term of this patent is extended or adjusted under 35 U.S.C. 154(b) by 197 days.

(21) Appl. No.: 16/103,575

(22) Filed: Aug. 14, 2018

(65) Prior Publication Data

US 2019/0052726 A1    Feb. 14, 2019

Related U.S. Application Data

(60) Provisional application No. 62/545,336, filed on Aug. 14, 2017.

(51) Int. Cl.
*H04L 12/24* (2006.01)
*H04L 29/08* (2006.01)
*H04L 29/12* (2006.01)

(52) U.S. Cl.
CPC .......... *H04L 67/32* (2013.01); *H04L 61/1511* (2013.01); *H04L 61/2007* (2013.01); *H04L 67/1002* (2013.01); *H04L 67/1014* (2013.01); *H04L 67/1023* (2013.01); *H04L 67/146* (2013.01); *H04L 67/2814* (2013.01); *H04L 67/2842* (2013.01)

(58) Field of Classification Search
CPC . H04L 67/32; H04L 67/1002; H04L 67/1023; H04L 67/1014; H04L 67/2842; H04L 67/2814; H04L 67/146; H04L 61/2007; H04L 61/1511

USPC ........................................................ 709/219
See application file for complete search history.

(56) References Cited

U.S. PATENT DOCUMENTS

| | | | |
|---|---|---|---|
| 10,270,878 B1* | 4/2019 | Uppal | ................ H04L 67/327 |
| 2012/0198043 A1* | 8/2012 | Hesketh | ............. H04L 67/1014 |
| | | | 709/223 |

(Continued)

OTHER PUBLICATIONS

International Search Report and Written Opinion of the International Searching Authority, dated Oct. 30, 2018, Int'l Appl. No. PCT/US18/046729, Int'l Filing Date Aug. 14, 2018; 12 pgs.

(Continued)

*Primary Examiner* — Moustafa M Meky
*Assistant Examiner* — Elizabeth Kassa

(57) ABSTRACT

Systems, methods, computer program products, and the like, for mapping requests for content received at a CDN to multiple mid-tier content servers. In an example, a method involves utilizing one or more hashing algorithms to map a URL associated with the mid-tier devices to one or more hostnames that may be utilized by the CDN to route requests for content to a particular mid-tier device when an edge device cannot service the request. In this manner, one content device of a particular metro receives requests for particular content and serves that content. By limiting the requests for particular content to a particular mid-tier device, storage may be more efficiently allocated across the mid-tier devices and content not replicated at multiple mid-tier devices.

11 Claims, 7 Drawing Sheets

(56) References Cited

U.S. PATENT DOCUMENTS

| | | | | |
|---|---|---|---|---|
| 2012/0203866 A1* | 8/2012 | Yoo | ............... | H04L 45/58 |
| | | | | 709/219 |
| 2015/0237155 A1* | 8/2015 | Power | ............... | H04L 67/2814 |
| | | | | 709/219 |
| 2015/0288647 A1* | 10/2015 | Chhabra | ............... | H04L 61/1511 |
| | | | | 709/245 |
| 2016/0094471 A1* | 3/2016 | Newton | ............... | H04L 67/2842 |
| | | | | 709/226 |
| 2017/0279916 A1* | 9/2017 | Kovacs | ............... | H04L 67/2842 |
| 2018/0077222 A1* | 3/2018 | Shnitko | ............... | H04L 67/327 |

OTHER PUBLICATIONS

International Preliminary Report on Patentability, dated Feb. 27, 2020, Int'l Appl. No. PC/US18/046729, Int'l Filing Date Aug. 14, 2018; 7 pgs.

* cited by examiner

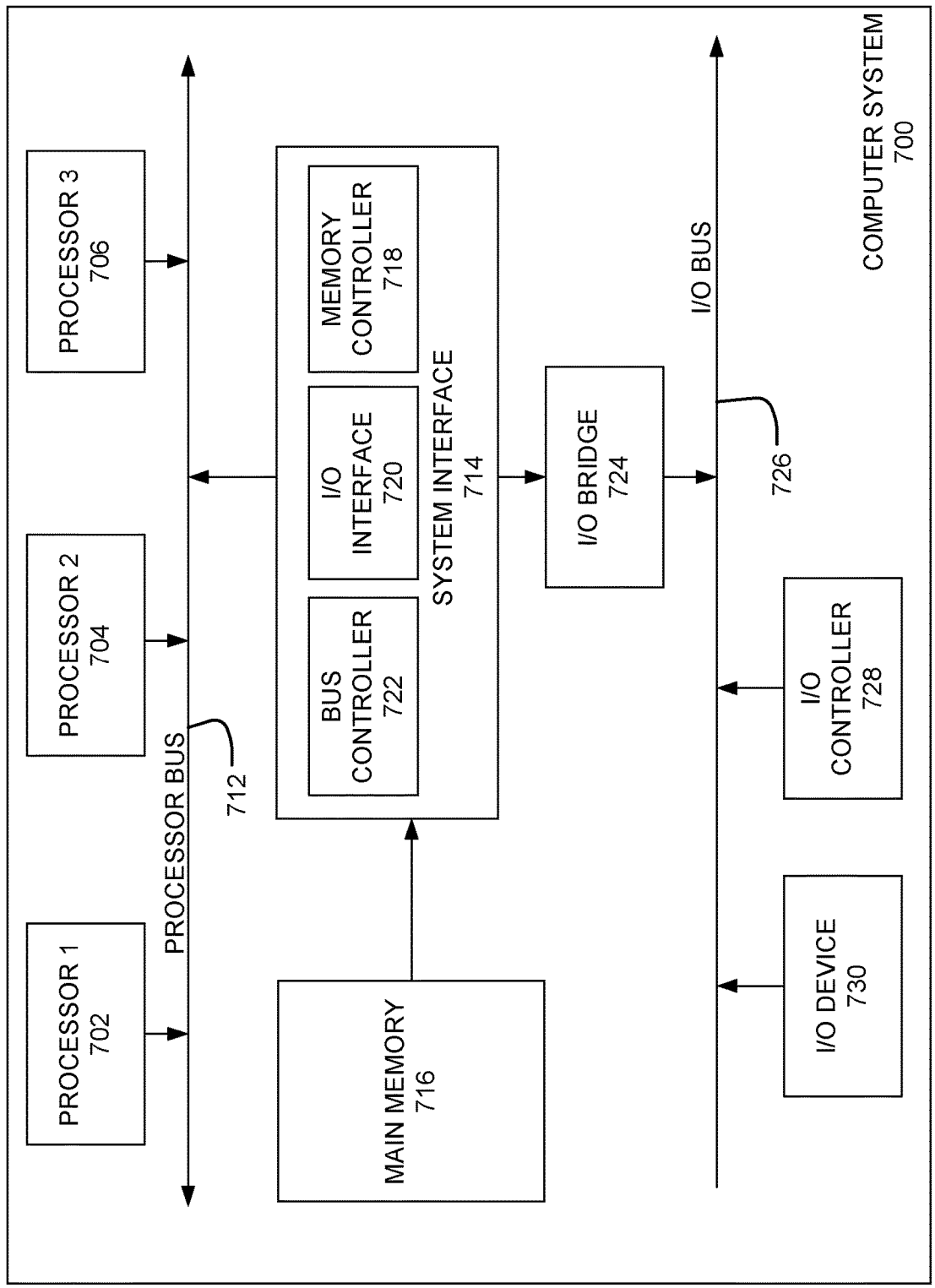

US 10,924,579 B2

SYSTEM AND METHOD FOR METRO MID-TIER MAPPING IN A CONTENT DELIVERY NETWORK

CROSS-REFERENCE TO RELATED APPLICATION

This application is related to and claims priority under 35 U.S.C. § 119(e) from U.S. Patent Application No. 62/545,336, filed Aug. 14, 2017, titled "SYSTEM AND METHOD FOR METRO MID-TIER MAPPING IN A CONTENT DELIVERY NETWORK," the entire content of which is incorporated herein by reference for all purposes.

TECHNICAL FIELD

Embodiments of the present invention generally relate to systems and methods for implementing a telecommunications network, and more specifically for mapping requests for content received at a content delivery network to a metro mid-tier (MMT) content delivery server.

BACKGROUND

The Internet and other networks are easily accessible using numerous possible devices. Content providers now use computer networks, like the Internet, to provide all kinds of content to devices throughout the world. In order to offload the job of serving some or all of its content, many content providers now operate or subscribe to content delivery networks (CDNs), which are, generally speaking, networks optimized to storing and delivering content. Using a CDN, content can be served to clients from the CDN (e.g., from one or more content servers in the CDN) instead of from the content provider's server(s). In a caching CDN, content may also be stored on CDN caches, often in a distributed form from edge servers within some area. ts for that content. Having content cached enhances the performance of the CDN because the content does not have to be retrieved from origin servers or other locations, which are less efficient or require additional steps as compared to serving the content directly from an edge server.

In some instances, content is not cached at the edge of the CDN nearest the requesting device; rather, the content is cached in a higher tier of content servers of the CDN. One such higher tier may be referred to as a "metro mid-tier" or MMT. Edge devices of the CDN may request content from such MMT devices when such content is not stored at the edge of the network. However, due to configuration and routing techniques utilized by the CDN, some MMT devices may receive a majority of the requests for and provide content while other MMT devices may remain relatively unused. This may introduce inefficiencies and delays in providing content from the CDN to a requesting device.

It is with these observations in mind, among others, that aspects of the present disclosure were conceived.

SUMMARY

One aspect of the present disclosure involves a content delivery network (and associated content delivery method) including a first device, which may be a server, router or other network device, DNS component, stand-alone device or distributed computing arrangement, generally including a processor in communication with a non-transitory storage medium having computer executable instructions stored therein. The computer executable instructions are configured to, in response to receiving a content request for content from an edge device unable to serve the content, generate an identification of an intermediate tier content device to obtain the content, the generation of the identification of the intermediate tier content device based on application of a hash algorithm to the content request.

In one example, the content request includes a first uniform resource locator, and the computer executable instructions are further configured to hash the first uniform resource locator to obtain a first hashed value, and using the first hash value, obtain a second uniform resource locator associated with a specific mid-tier server to request the content. Still further, to obtain the second uniform resource locator associated with a specific mid-tier server to request the content, the computer executable instructions are configured to access a first hash map that correlates hash values with intermediate tier content devices, the first hash map including a first correlation of the first hash value and the second uniform resource locator for the specific mid-tier server.

A method for operating a telecommunications network involving the operations of applying a first URL associated with a first metro mid-tier (MMT) content server, which may be any tier of content servers deeper than edge and in some examples is the next tier after the edge with a particular metro, to a hashing algorithm to obtain a MMT hash value. The method further involves mapping the MMT hash value to a MMT/hash value map comprising a plurality of value regions, wherein mapping the MMT hash value to the MMT/hash value associates a particular value region to the first MMT content server. The method further involves applying a second URL associated with a hostname of a CDN to the hashing algorithm to obtain a hostname URL hash value, the hostname URL hash value within the particular value region of the MMT/hash value map and correlating the hostname URL hash value to the particular value region to the first MMT content server. The method may further involve configuring a Domain Name Server (DNS) of the CDN to return a network address of the first MMT content server when receiving a request comprising the hostname of the CDN.

BRIEF DESCRIPTION OF THE DRAWINGS

FIG. 7 is a diagram illustrating an example of a computing system which may be used in implementing embodiments of the present disclosure.

DETAILED DESCRIPTION

Aspects of the present disclosure involve systems, methods, computer program products, and the like, for mapping requests for content received at a CDN to multiple MMT content servers. In particular, a method is provided that for utilizing one or more hashing algorithms to map a Uniform Resource Locator (URL) associated with the MMT devices to one or more hostnames that may be utilized by the CDN to route requests for content to a particular MMT device. In this manner, only one MMT device of a particular metro receives requests for a particular content (identified through a URL associated with the requested content). By limiting the requests for particular content to a particular MMT, the CDN may utilize the storage space of the MMT devices more efficiently. In particular, content may be limited to storage on one MMT device of the metro instead of being stored on every MMT device that receives a request for the content. By improving the efficiency of storage of content on the MMT devices, more content may be stored at the metro level for faster transmission to requesting device.

In some implementations, the use of MMT device mapping for content retrieval selection may also provide for efficient scaling of the MMT of the CDN. For example, mapping of received URLs for particular content to a hostname that is then resolved to a particular MMT device may provide for efficient content storage within the MMT. However, an administrator of the CDN may manually update a Domain Name Server (DNS) resolver device to provide the correlation between a hostname and a particular MMT device. As a MMT of the CDN grows to add additional MMT content servers, the DNS must be updated to include the new MMT servers. This process may be time consuming for the administrator and provides a potential for mistakes in correlating a hostname to a MMT device. Through the MMT mapping process discussed herein, however, the process of generating an MMT map and updating the DNS according to the map may occur automatically upon the addition or subtraction of MMT devices to the tier, removing the need for a CDN administrator to manually update the DNS. Further, some implementations may apply a weighting factor to the MMT mapping to address differences in the capabilities and/or capacities of different types of MMT devices deployed in the same metro tier. Also, the generation of the MMT map may be optimized to include new MMT devices while minimizing the amount of filling and transfer of content between MMT devices upon updating of the DNS.

Figure 1:
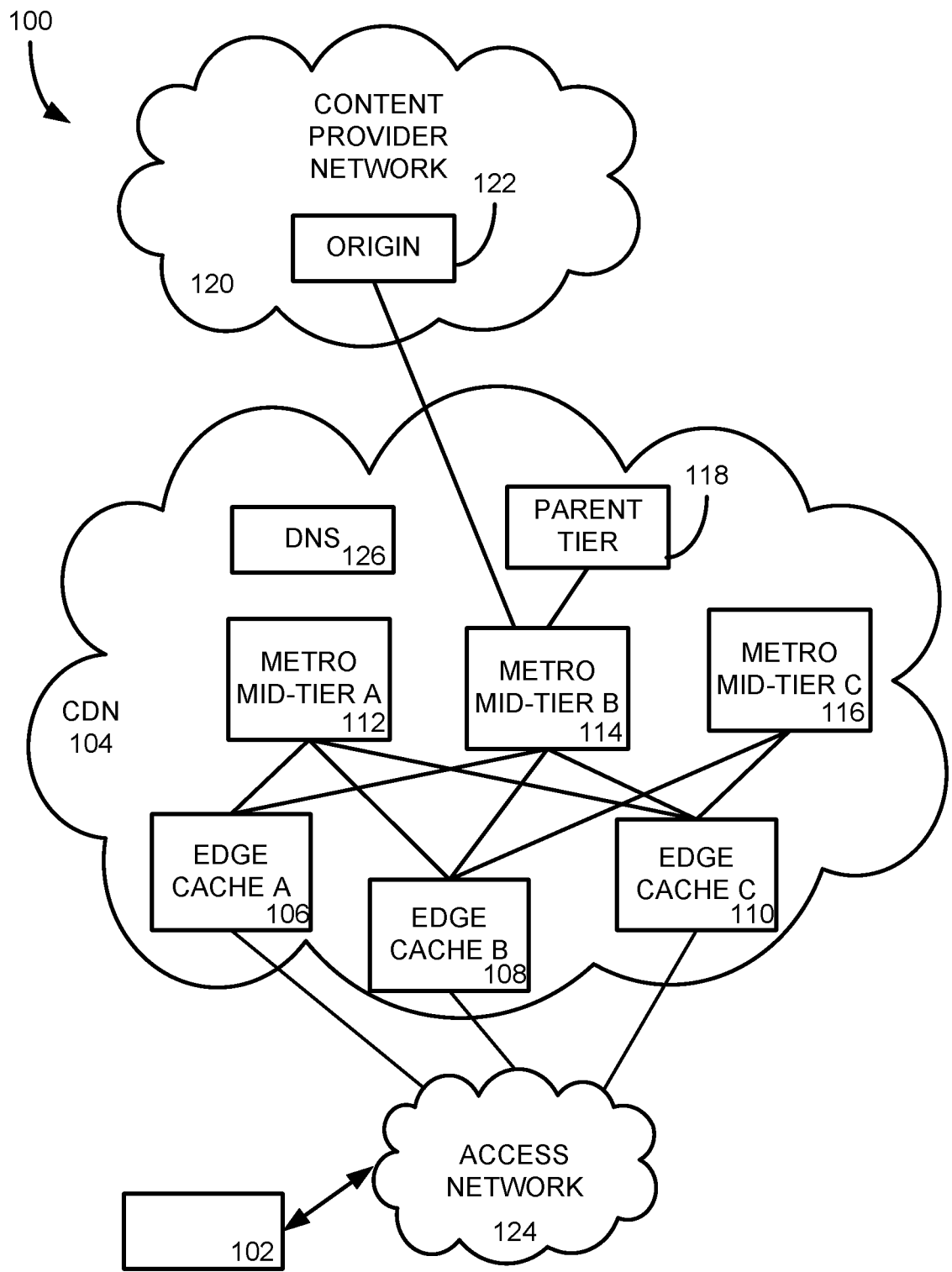
FIG. 1 is an example network environment for distributing content over a telecommunications network.

FIG. 1 is an example network environment 100 for distributing content to one or more users. Although illustrated in FIG. 1 as a content delivery network, it should be appreciated that aspects of the present disclosure may apply to any type of telecommunications network that utilizes IP addresses for connecting a device to one or more components of the network to retrieve content. For example, aspects of the disclosure may be utilized to connect a device to an endpoint in the network, a conferencing server, a virtual private network device, and the like. Thus, although the CDN architecture is used throughout the document as the example network architecture through which aspects of the present disclosure may be applied; other network architectures and configurations are similarly contemplated.

Also, the term "content" as used herein means any kind of data, in any form, regardless of its representation and regardless of what it represents. Content may include, without limitation, static and/or dynamic images, text, audio content, including streamed audio, video content, including streamed video, web pages, computer programs, documents, files, and the like. Some content may be embedded in other content, e.g., using markup languages such as HTML and XML. Content includes content which is created or formed or composed specifically in response to a particular request. The term "resource" is sometimes used herein to refer to content.

In general, the CDN 104 comprises one or more components configured to provide content to a device upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, a device 102 (sometimes referred to as a requesting device) connects to the CDN 104 through one or more access networks 124 to request and receive content or content files from the CDN. The access network 124 may be under the control of or operated/maintained by one or more entities, such as, for example, one or more Internet Service Providers (ISPs) that provide access to the CDN 104. Thus, for example, the access network 124 may provide Internet access to a user device 102. In addition, the access network 124 may include several connections to the IP network of the CDN 102. For example, access network 124 includes access to edge cache A 106, edge cache B 108, and edge cache C 110. Also, the edge devices 106-110 may connect to any number of access networks 124 to receive requests for content from countless possible devices. Also, other users may connect to the CDN 104 through access network 124. In general, access to a CDN 104 (or underlying IP network associated with the CDN) may occur through any number of ingress ports to the CDN through any number of access networks.

The CDN 104 is capable of providing content to a device 102, which is generally any form of computing device, such as a personal computer, mobile device, tablet, set-top box, smart TV, or the like. The device 102 is configured to request, receive, process, and/or present content. In one example, the device 102 includes an Internet browser application with which a link (e.g., a hyperlink) to a content item may be selected or otherwise entered, causing a request to be sent to an edge cache device 106-110 in the CDN 104, from which the content may be available to serve to the device.

The CDN 104 includes one or more edge servers 108-110, which may cache content to make it available in a more geographically or logically proximate location to the device 102. The edge servers 108-110 may reduce network loads, optimize utilization of available capacity, lower delivery costs, and/or reduce content download time. The edge server 108-110 is configured to provide requested content to a requesting device, which may be the user device 102 possibly via other devices, for example, in the access network 124. In one implementation, the edge server 108-110 provides the requested content that is locally stored in cache. However, as discussed herein, not all content is locally cached in which case the content is retrieved from other storage tiers of the CDN or an origin storage.

The CDN 104 of FIG. 1 includes several tiers of servers, namely a tier of edge servers 106-110, metro mid-tier servers 112-116 (otherwise referred to as intermediate content servers), and a tier of parent servers 118. Each tier of servers may comprise a number of servers organized into server groups (sometimes referred to as server clusters). The servers may include some virtualization. An origin server 122 may be embodied in the CDN 104 itself (in some implementations) or in content provider network 120 (such as origin server 122). It should be appreciated, however, that any number of possible CDN architectural arrangements with various server tiers, origins and the like may be utilized. The edges are shown connected to the various mid-tier caches of a metro; however, an edge may be in a distinct network or location, and bound to one or more of the mid-tier servers 112-116. Through the use of a metro configuration, many advantages are achieved. For example, locating one or more MMT servers 112-116 proximate to the edge servers 106-110 may minimize or reduce latency and infrastructure cost by directly connecting the edge server to the mid-tier server rather than utilizing routing fabric to connect the mid-tier to the edge. Further, the use of the MMT devices 112-116 may allow very large libraries to be held close to the edge servers 106-110, such that the very popular content is cached at the edge while less popular content and so-called long tail content is stored in one or more intermediate tiers such as the illustrated MMT. The metro-mid tier indicates a server contacted by a preceding server that cannot serve a content request. In some example, the metro-mid tier server is also a server that does not receive an initial content request from a requesting device.

Typically, metro CDN configurations are provided to serve particular geographic regions of the CDN 104. For example, a particular CDN 104 may have six groups—four groups of servers in the United States, group 1 for the West Coast, group 2 for the mid-west, Group 3 for the northeast and Group 4 for the south east; and various possible groupings each for Europe and Asia. Thus, each group or region may have their own configuration of edge servers 106-110 and MMT devices 112-116 for providing content to users located geographically near or within the corresponding region. This operates to provide the content to the users from devices that are near the users to reduce the distance of content transmission. Further, in some instances, edge devices 106-110 and/or MMT devices 112-116 may include a popularity service to determine which content is cached at the edge devices (that content which is most popular) and which content is maintained or stored at the MMT devices (less popular content). Such popularity determinations may occur based on the entire CDN 104, based on the particular region in which the edge devices and MMT devices are embodied, or otherwise determined.

In general, some or all of the servers in each tier of the CDN 104 can exchange data with some or all of the servers in the metro. Thus, some or all of the MMT servers 112-116 can exchange information with some or all of the edge servers 106-110. For the sake of simplicity, in the drawings, each tier of servers is shown as being operationally connected to each other tier. In some CDNs 104, however, it may be preferable that the servers in a particular tier can only exchange information with other servers in the same group (i.e., with peer servers) and/or with other servers in the same group in a different tier. In addition, content servers in one metro or region may exchange content with content servers in other regions or metros.

To provide content to a requesting device 102, the CDN 104 may also include a directory or authoritative server 126 that responds to the request for content by providing a network address (e.g., an IP address) where the content associated with the selected link can be obtained. In one implementation, the directory server 126 provides a domain name system (DNS) service, which resolves an alphanumeric domain name to an IP address. Thus, to request content from the CDN 102, a requesting device or network provides a URL associated with the content. The directory server 126 may resolve the link name (e.g., URL, host name, or other identifier) to an associated network address within the CDN 104 from which the device 102 can retrieve the content. The requesting device 102 than contacts the edge server at the provided network address to request the content. The request will include information including a URL, which will include an identification of the requested content. In some instances, the access network 124 may also include a DNS service. Devices within the CDN 104 may also have a URL or other name associated with the device for use in routing communications, such as requests for content, to any other device within the network 104, connected to the network, or in communication with the network.

As mentioned above, requests may be received at an edge device 106 for content that is not cached at the edge device. Generally speaking, the edge server will perform a look-up based on the content indication of the URL to determine whether it has the content locally cached. When the content is not locally available, the edge cache 106 may transmit the request for content to an MMT device 112 or may request the content itself from the MMT device to locally cache the content and serve it to the requesting device. In some CDNs 104, the edge device 106 that receives a request for un-cached content may select any of the MMT devices 112-116 to provide the content either to the edge device or to the requesting device 102. However, this may result in or otherwise involve multiple MMT devices 112-116 storing the same content, which is an inefficient use of the storage capacity of the MMT tier. For example, a request for un-cached content (based on a content URL) may be received at edge cache A 106. Edge cache A 106 may request the content from MMT-A 112, which may itself have the content cached or may retrieve the content from a parent tier 118 or origin server 122 for storage at the MMT device. In a similar manner, a request for un-cached content (based on the same content URL) may be received at edge cache B 108 which may, in turn, request the content from MMT-B 114. This results in both MMT-A 112 and MMT-B 114 retrieving and then locally caching the content at the respective MMT. A more efficient operation of the CDN 104 may provide for designating or otherwise providing a method for selecting a particular MMT device 112-116 of the metro for storing particular content and directing all received requests for that content to the MMT device that has the content cached thereby possibly eliminating redundant storage at the mid-tier or other intermediate tier, and redundant requests for content for mid-tier caching and thus more responsive requests to the mid-tier.

Figure 2:
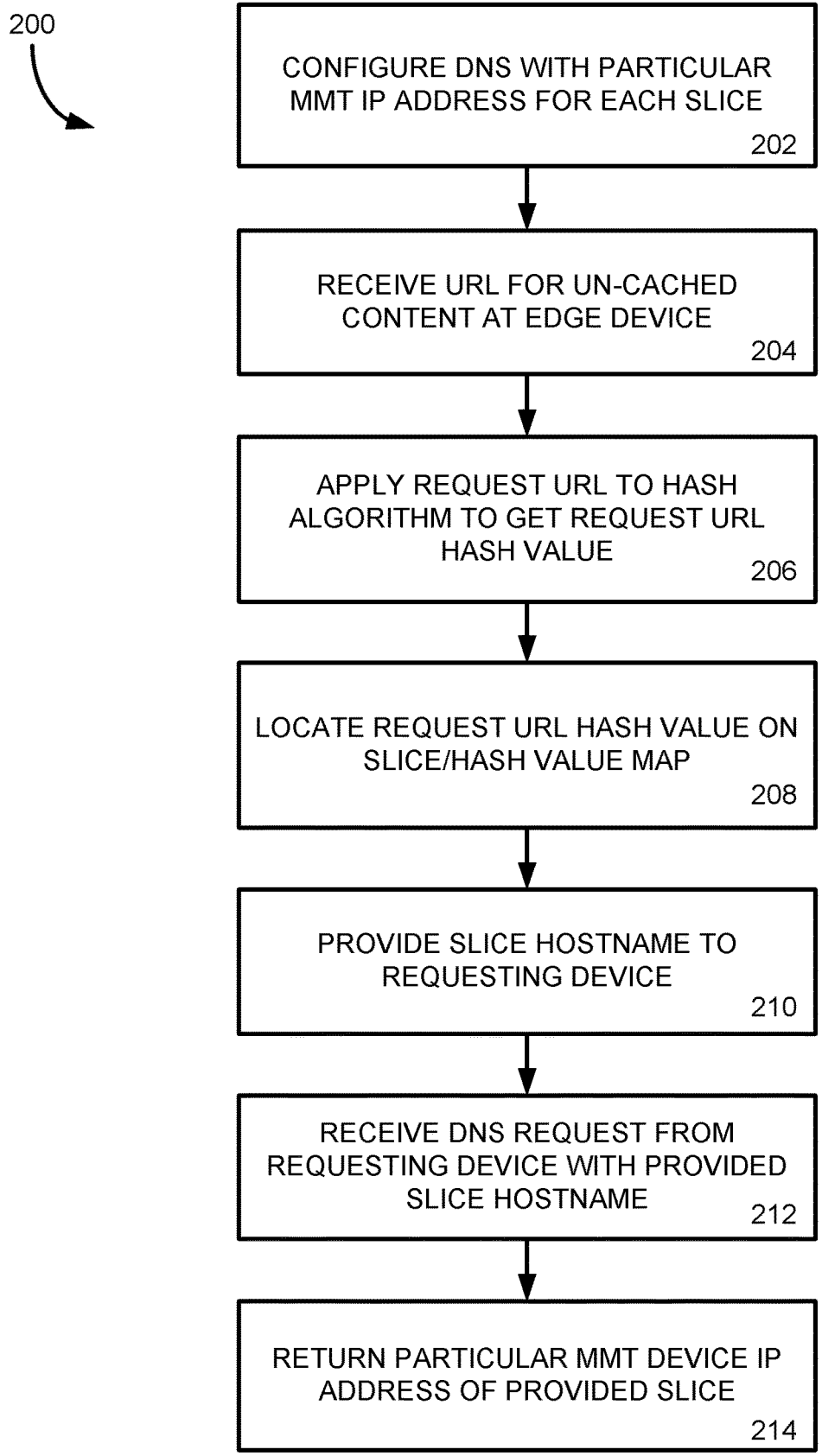
FIG. 2 is a flowchart of a method for transmitting a request for content to a particular metro mid-tier content server for providing the content to a requesting device.

FIG. 2 is a flowchart of a method 300 for managing request to the mid-tier, and more particularly for transmitting a request for content to a particular MMT content server. In general, the operations of the method 200 may be performed by any component of group of components or administrative devices of the CDN 104. Through the execution of the operations, a particular MMT device 112-116 may be selected or otherwise identified as a MMT storage server from which a particular content may be obtained.

Beginning in operation 202, DNS 126 or other authoritative device is configured with particular MMT device information. In particular, the DNS 126 may be configured to correlate a particular MMT device (such as MMT-A 112) with a representative hostname URL, also referred to herein as a "slice" or "slice hostname". In general, a hostname is a URL that the CDN 104 utilizes to correspond to an MMT device. In one particular example, the CDN 104 may utilize 12 hostname URLs for the MMT. Thus, for the MMT configuration of the network 100 of FIG. 1, the 12 hostname URLs or slices would be mapped to or otherwise associated with the MMT devices 112-116. In the illustrated example with three MMT devices 112-116, each MMT would have four slices. In a metro configuration with 12 MMT devices, each MMT device may have an associated slice. Each MMT device 112-116 may be associated with any number of slices and the distribution of slices across the MMT devices need not be uniform in all cases. Further, the CDN 104 may utilize any number of slices to correspond to the MMT devices 112-116 of the metro.

The DNS 126 includes a correlation between each slice and the IP address of a respective MMT device 112-116. In other words, the DNS 126 is configured to associate a slice with at least one MMT device 112-116 such that, when a DNS request is received with the slice or hostname, the DNS 126 may return the IP address for a particular MMT device. An IP address of an MMT device 112-116 may be associated with each utilized slice or hostname in the DNS 126, with some IP addresses potentially associated with multiple slices (in the case where there are more slices than MMT devices 112-116 in the metro).

In operation 204, the CDN 104 receives a request for content at an edge cache 106-110. The requested content is not cached at the edge tier. The request (e.g., http or https request) includes a URL with some portion that identifies the content being requested from the CDN 104. To determine from which MMT device 112-116 the edge device should then request the content, the CDN 104 (or component of the CDN) may apply the request URL (e.g., the content identifying portion) to a hash algorithm to generate a request URL hash value. In some implementations, the hash algorithm may be a MD5 algorithm that inputs a URL and outputs some value, such as a 32-bit binary value. In general, however, the hash algorithm utilized by the CDN 104 may be any type of algorithm and the value may be any number of bits suitable to the particular CDN, mid-tier implementation and content volume, among other possible factors. Generally speaking, the content identifying portion of the URL request will be the same irrespective of the edge receiving the initial request and the device from which the request is received. Thus, the hash will return a consistent URL hash value regardless of which edge receives the request.

Figure 3:
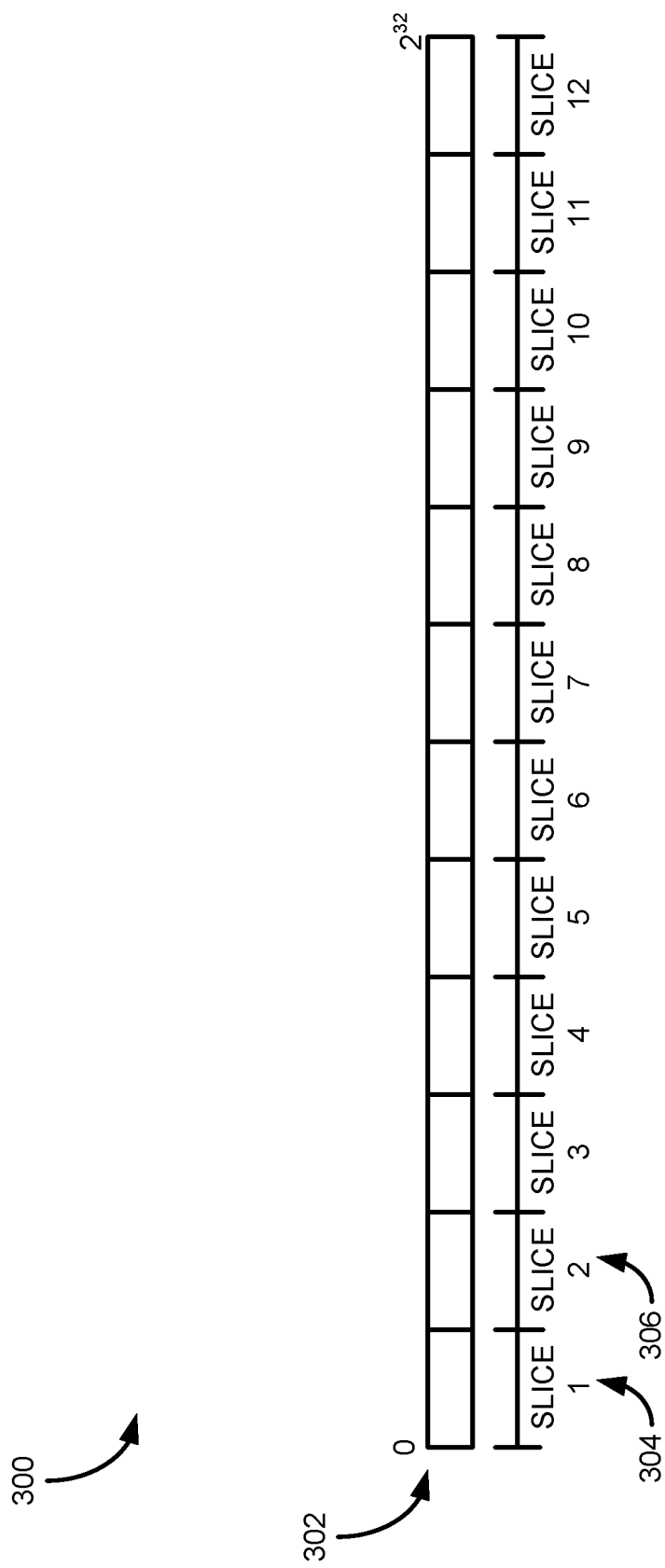
FIG. 3 is an illustration of a hostname/hash value map utilized by a Content Delivery Network to select a metro mid-tier content server for providing the content to a requesting device.

In operation 208, the CDN 104 may locate the generated request URL hash value on a slice hostname/hash value map. FIG. 3 is an illustration of a slice/hash value map 300 utilized by the CDN to map the request URL hash value. Generally speaking, in one example, a contiguous block of hash values maps to a slice, and there are multiple hash blocks. As illustrated, the slice/hash value map 300 has a number line 302 that begins at value zero and extends to an upper value, such as $2^{32}$ (although any upper limit value may be used). The map shown is merely a graphical depiction of the data construct used to store to the hash/slice correlation. The hash values represented by the number line 302 are divided (in some cases equally, although not required) into a number of regions. In one implementation, the number of regions is the same as the number of slices utilized by the CDN 104. With this map 300, a request URL hash value may be correlated or mapped to a particular slice or hostname. For example, if hash values are equally divided across the number of slices, then each map region will have $2^{32}/12$ hash values. If a request URL has a hash value of 1,000, for example, it will fall into the first region 304 assigned to the first slice (labeled "slice1"). This region may be assigned to a first slice or hostname utilized by the CDN 104 for this purpose. Through the application of the request URL hash value to the slice/hash value map 300, the request URL may correspond with slice1 of the CDN 104. As should be appreciated, other request URL hash values may correspond to other slices or hostnames, depending on where along the number line 302 the hash value occurs.

Although the regions 304, 306 are illustrated in FIG. 3 as being contiguous, it should be appreciated that the regions associated with any slice may be non-contiguous. In other words, a particular slice may be associated with several regions of the map 300. As explained in more detail below, such non-contiguous mapping may aid the CDN 104 in minimizing the impact on the network when additional MMT devices are added to the tier or CDN. For the sake of simplicity and for example, however, the map 300 is illustrated in FIG. 3 as including contiguous regions of values associated with the slices. Regardless of the configuration of the regions 304, 306 along the number line 302, a particular request URL hash value may fall within a particular region of the map and correspond to a particular slice or hostname of the CDN 104. Moreover, the hash will translate the same URL value to the same hash value and hence the same slice consistently.

In operation 210, the CDN 104 (such as the edge device 106 receiving the request) may provide the hostname or slice corresponding to the request URL hash value to the requesting device or the edge may contact the slice to retrieve the content. Following the above example, the request URL hash value of 1,000, returns the slice1 information. In one implementation, the requesting device is the edge device 106 such that slice1 is provided to the edge device, which then contacts DNS to resolve the IP address for slice1, or a resolved IP address to slice1 is provided. In another implementation, slice1 is provided to requesting device 102 for resolving, or a resolved IP address to the slice is provided. In a resolving situation, in operation 212, the DNS 126 receives the slice1 hostname from the requesting device to resolve the hostname into an IP address. As discussed above, the DNS 126 is configured to correlate a particular slice or hostname to an IP address of a particular MMT device 112-116. Thus, the DNS 126 may return a particular MMT IP address (corresponding to the slice) to the requesting device in operation 214. In this manner, a request URL always resolves to a particular MMT device 112-116 of the metro as the request URL hash value corresponds to a particular slice in the slice/hash value map 300 that the DNS 126 associates with the particular MMT device. Although examples discussed herein refer a metro mid-tier of servers, the techniques discussed herein are applicable to storing and accessing content from other intermediate tiers of servers (e.g., content servers) deeper than the edge servers. With respect to MMT or otherwise, redundant storage of content at the MMT of the metro does not occur as requests for a particular content are fulfilled by the same MMT of the metro.

In one example, when a content request is received at a particular mid-tier device and the MMT device does not have the content, it will request the content from another tier, such as the parent tier, or an origin cache. The mid-tier device may then cache the content. Any subsequent request for the content will be served directly by the mid-tier device. In such a way, only the mid-tier device associated with the content hash value will cache the content.

Although the above systems and methods provide a more efficient storage of content at the MMT of a metro CDN 104, performance issues may occur as the MMT expands to accommodate additional storage for additional content. For example, the addition of MMT devices 112-116 to the tier may require generating a new slice/hash value map 300 to include the new MMT device, as well as a new configuration of the DNS to correlate one or more slices to the newly added MMT device. Further, the number of MMT devices 112-116 may outgrow the number of slices utilized by the CDN 104. Still further, any changes to the storage profile of the MMT devices (such as load balancing based on traffic patterns, an outage at one or more of the MMT devices, and the like) would similarly require updating of the DNS 126 each time a change occurs. Thus, an alternative and enhanced implementation of the MMT mapping to select a particular MMT to cache particular content is provided below in FIG. 4.

Figure 4:
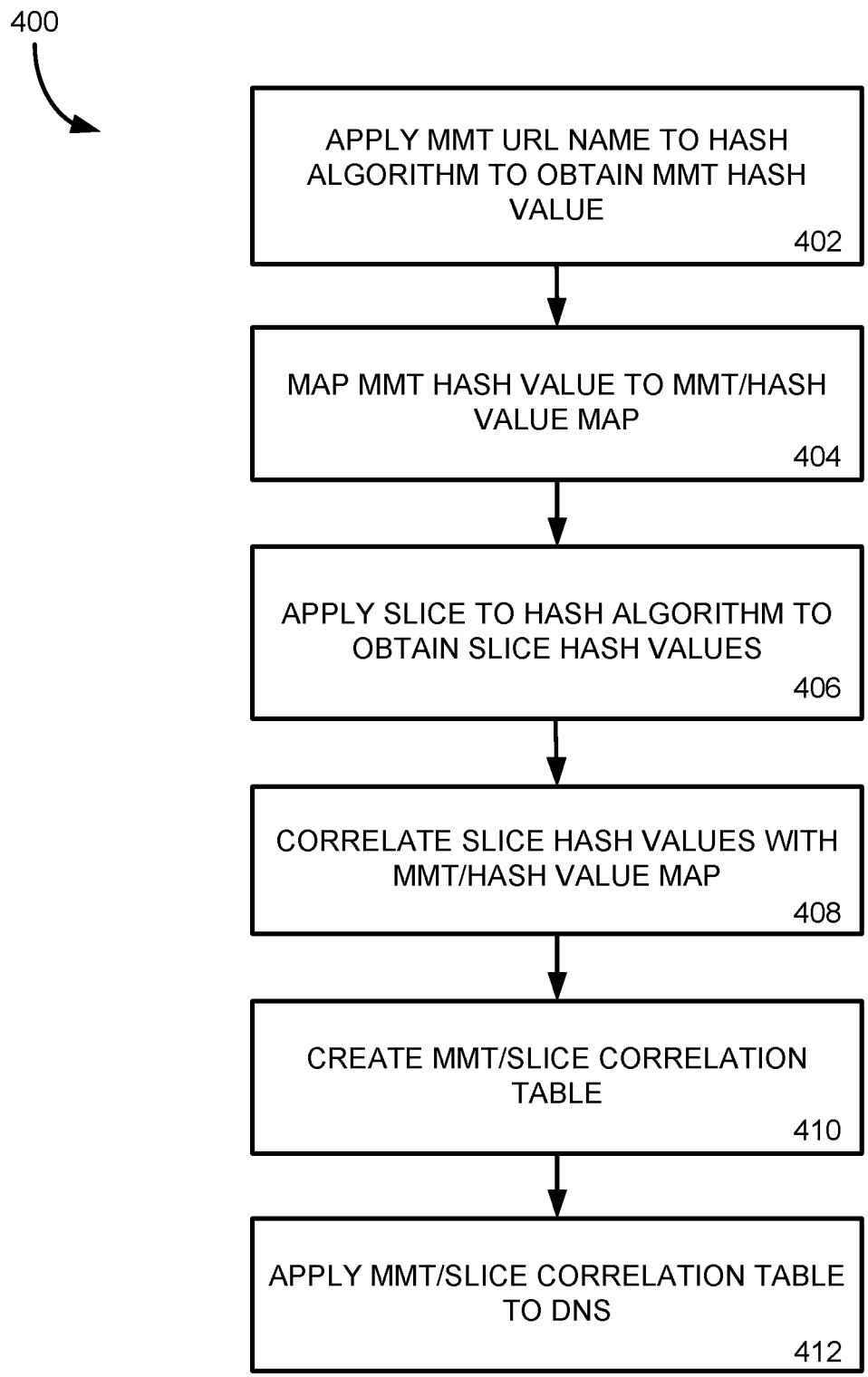
FIG. 4 is a flowchart of a method for configuring a Domain Name Server with metro mid-tier Internet Protocol addresses corresponding to one or more hostnames utilized by a Content Delivery Network.

FIG. 4 is a flowchart of a method 400 for automatically configuring a DNS with MMT IP addresses corresponding to one or more slices utilized by a CDN. Similar to above, the operations of the method 400 may be performed by any component of the CDN 104 or any component in communication with the CDN. Through the operations of the method 400, a table may be created that correlates MMT devices 112-116 of the CDN 104 to the slices or hostnames utilized by the network that may be used to configure the DNS 126 of the metro automatically to improve the efficiency and operability of the CDN.

Beginning in operation 402, the CDN 104 applies a URL name for each MMT device 112-116 to a hash algorithm to obtain a MMT hash value for each MMT device. As above, the hash algorithm may be a MD5 algorithm that inputs a URL and outputs some value, such as a 32-bit binary value. In general, however, the hash algorithm utilized by the CDN 104 may be any type of algorithm and the value may be any number of bits. Further, the hash algorithm utilized to generate the MMT hash values need not be the same as the hash algorithm that generates the request URL hash values discussed above. In one example, MMT-A 112 may have a URL associated with the device by the CDN 104, such as MMT1.metro.CDN.net. Other MMT devices, such as MMT-B 114 and MMT-C 116 may have other URLs associated with those devices. These URLs are each hashed into a respective MMT hash value.

Figure 5:
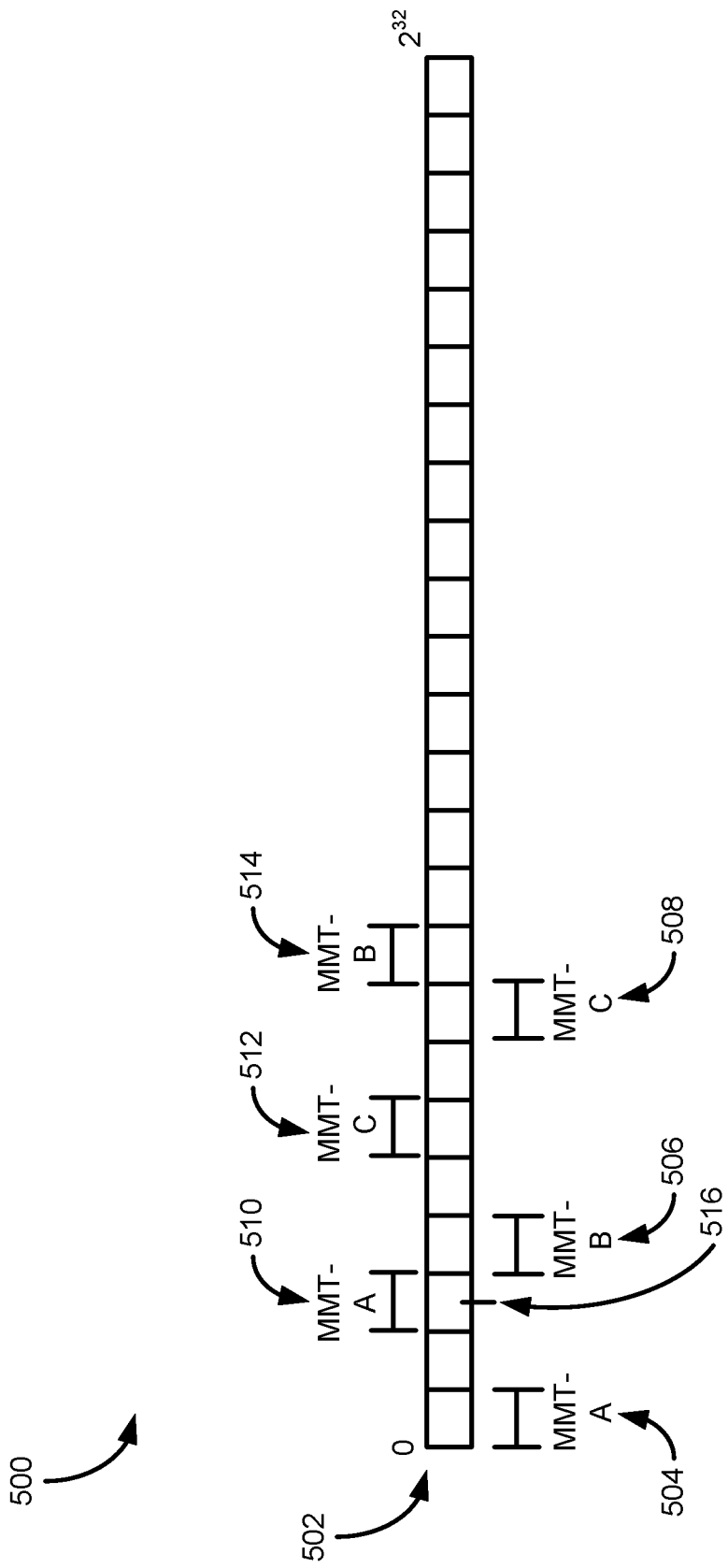
FIG. 5 is an illustration of a MMT device/hash value map utilized by a Content Delivery Network to configure a Domain Name Server for providing the content to a requesting device.

In operation 404, the CDN 104 may generate an MMT device/hash value map, such as that map 500 illustrated in FIG. 5. Similar to the map 300 of FIG. 3, the MMT device/hash value map 500 defines a number of regions across the length of the hash values, which is represented by a number line 502 that begins at value zero and extends to an upper value, such as $2^{32}$ (although any upper limit value may be used). The map (number line 502) may be divided into a number of regions, which may or may not be equally sized. In some implementations, each region of the map 500 is assigned or otherwise associated with an MMT device 112-116 of the metro CDN 104. For example, region 504 of the map 500 is associated with MMT-A 112, region 506 is associated with MMT-B 114, and region 508 is associated with MMT-C 116. In this manner, every region of the MMT device/hash value map 500 is associated with an MMT device 112-116 of the metro of the CDN 104. For example, a metro with 60 MMT devices may have 60 regions of the map 500 associated with each of the 60 MMT devices, which regions may further be each divided into slices. Further, the regions associated with a particular MMT device may not be contiguous along the number line 502. For example, region 506 and region 514 may be associated with MMT-B 114 although those regions are not contiguous along the number line 502. In general, the MMT device/hash value map 500 may be any configuration of regions and associated MMT devices 112-116.

In one particular example, the MMT device/hash value map 500 is generated in the following manner. The URL associated with each MMT device 112-116 is hashed as explained above. For example, URL MMT1.metro.CDN.net for MMT-A 112 is hashed utilizing the hashing algorithm, as are the other MMT device URLs. These values are then applied to the number line 502 of the map 500 to establish X number of values along the number line. Additional hash values may also be generated and associated with the MMT devices. For example, the CDN 104 may alter a given MMT URL, such as creating MMT1.metro.CDN.net_1 and create a new hash value for MMT-A 112 from this generated URL. In addition, the CDN 104 may perform these steps multiple times, such as MMT1.metro.CDN.net_2, MMT1.metro.CDN.net_3, MMT1.metro.CDN.net_4, etc. and generate a hash value for each of the generated URLs for MMT-A 112. In one particular embodiment, the CDN 104 generates 100 such URLs and hash values associated with MMT-A 112, and applies each of those hash values to the map (number line 502). Similarly, the CDN 104 may generate 100 URLs and hash values associated with MMT-B 114 and apply those values to the number line 502, 100 URLs and hash values associated with MMT-C 116 and apply those values to the number line, and so on for every MMT device in the metro CDN. With each generated hash value applied to the number line 502 and associate with a particular MMT device, the CDN 104 may then create regions of the map (along the number line) that correspond to the mapped hash values to generate the regions of the map 500 illustrated in FIG. 5. In this manner, each MMT device 112-116 is assigned multiple regions along the number line 502 of the map 500, with the regions being non-contiguous for a given MMT device.

Returning to the method 400 of FIG. 4, the CDN 104 may also apply the slices or hostnames utilized by the CDN to a hashing algorithm to obtain a slice hash value for each slice. As above, the hashing algorithm may be the same hashing algorithm as used in other aspects of the method or may be a different hashing algorithm. Further, the CDN 104 may utilize any number of hostnames or slices. In one particular implementation and to further illustrate the concepts disclosed herein, the mid-tier may be divided into 128 slices. Each of these slices (which take the form of a URL) are hashed and the corresponding 128 hashing values are correlated to the generated MMT device/hash value map 500 in operation 408. In other words, the slice hash value may be a 32 bit number that corresponds to a value of the map (along the number line 502) of the MMT device/hash value map 500.

When applied to the MMT device/hash value map 500, each slice hash value may correspond or fall within a defined range of the MMT device/hash value map for a particular MMT device 112-116. For example, assume that a hash value for a particular slice (such as slice1 or hostname1) equates to location 516 along the number 502 of the MMT device/hash value map 500. On the MMT device/hash value map 500, location 516 is within a region 510 of numbers assigned to MMT-A 112. Thus, through the application of the hash value of slice1 to the MMT device/hash value map 500, the CDN 104 may correlate slice1 to MMT-A 112. Each slice used by the CDN 104 may be similarly applied or correlated to the MMT device/hash value map 500 to obtain a MMT device 112-116 for each of the slices or hostnames. In instances where 128 different slices are utilized by the CDN 104, all 128 slices are hashed and the resulting hashed values are correlated to a MMT device 112-116 based on the MMT device/hash value map 500.

In operation 410, the CDN 104 may create a MMT/slice correlation table that lists the correlation between the slices and the MMT devices obtained through the MMT device/hash value map 500. An example correlation table is illustrated in Table 1 below.

TABLE 1

| SLICE | MMT DEVICE |
|---|---|
| 1 | 5 |
| 2 | 3 |
| 3 | 1 |
| 4 | 2 |
| 5 | 5 |
| . | . |
| . | . |
| 128 | 52 |

As shown, the MMT/slice correlation table provides an associated MMT device for each slice utilized by the CDN 104. This table may be created in any form for use by the CDN 104 and is illustrated here as a table merely for descriptive sake. With the correlation information between the slices and the MMT devices 112-116 of the metro generated, the CDN 104 may apply the correlation information to the DNS 126 or other authoritative device of the CDN in operation 412 to configure the DNS with the correlation information. The DNS 126 may, in turn, associate an IP address for each MMT device 112-116 with the corresponding slices in the table such that when a requesting device requests resolution from the DNS with the slice, the IP address for the correlated MMT device 112-116 is returned.

Through the method 400 of FIG. 4, the CDN 104 may utilize a hashing algorithm to create an MMT/slice correlation table that associates each slice used by the CDN with a particular MMT device 112-116 in the metro. With the CDN configured, the CDN 104 may return to operation 204 of the method 200 illustrated in FIG. 2 to receive a URL for un-cached content, apply the request URL to a hash algorithm, apply the hash value to a slice/hash value map to obtain a particular slice associated with the request URL, and return the particular slice to the requesting device. When the requesting device provides the slice to the DNS 126 for resolving, the DNS returns the particular MMT device 112-116 based on the MMT/slice correlation table generated above. In this manner, the DNS correlation tables of the CDN 104 may be automatically configured through the method 400 outlined in FIG. 4 by hashing the URLs of the MMT devices and the slices of the CDN, creating a MMT/hash value map 500, and generating a MMT/slice correlation table from the MMT/hash value map. The correlation table may then be transmitted to the DNS 126 in any form to instruct the DNS to be configured with the MMT/slice correlation table.

By removing the step of configuring the DNS 126 (which may be a manual operation) and, instead, automatically generating a MMT/slice correlation table to configure the DNS, the operation of the CDN 104 becomes more efficient and cost-effective. Further, because the process of configuring the DNS 126 occurs automatically, there is a reduced chance of human error in configuring the network 104, improving the stability and operation of the network. Further still and discussed in more detail below, the methods and systems discussed herein improve the process of adding or expanding the number of MMT devices into the CDN 104 while minimizing the impact on the operation of the CDN. As such, the process of mapping or selecting a particular MMT device from which particular content may be obtained by an edge device 106-110 may become more efficient and less error-prone than previous processes.

As more users of a CDN 104 request content from the content servers, CDNs may expand to meet the added demand. In one example, a CDN administrator may purchase and install additional content servers within the CDN 104 to reduce the workload on the existing content servers. Through this network expansion, additional requests and users may be serviced. However, adding MMT devices into a metro CDN 104 may be difficult when attempting to map particular content requests to a particular MMT device. In particular, adding new MMT devices to a metro may require an administrator to manually reconfigure a DNS 126 to add the new MMT devices into the content request process while attempting to load balance content across the MMT devices in an efficient manner.

Figure 6:
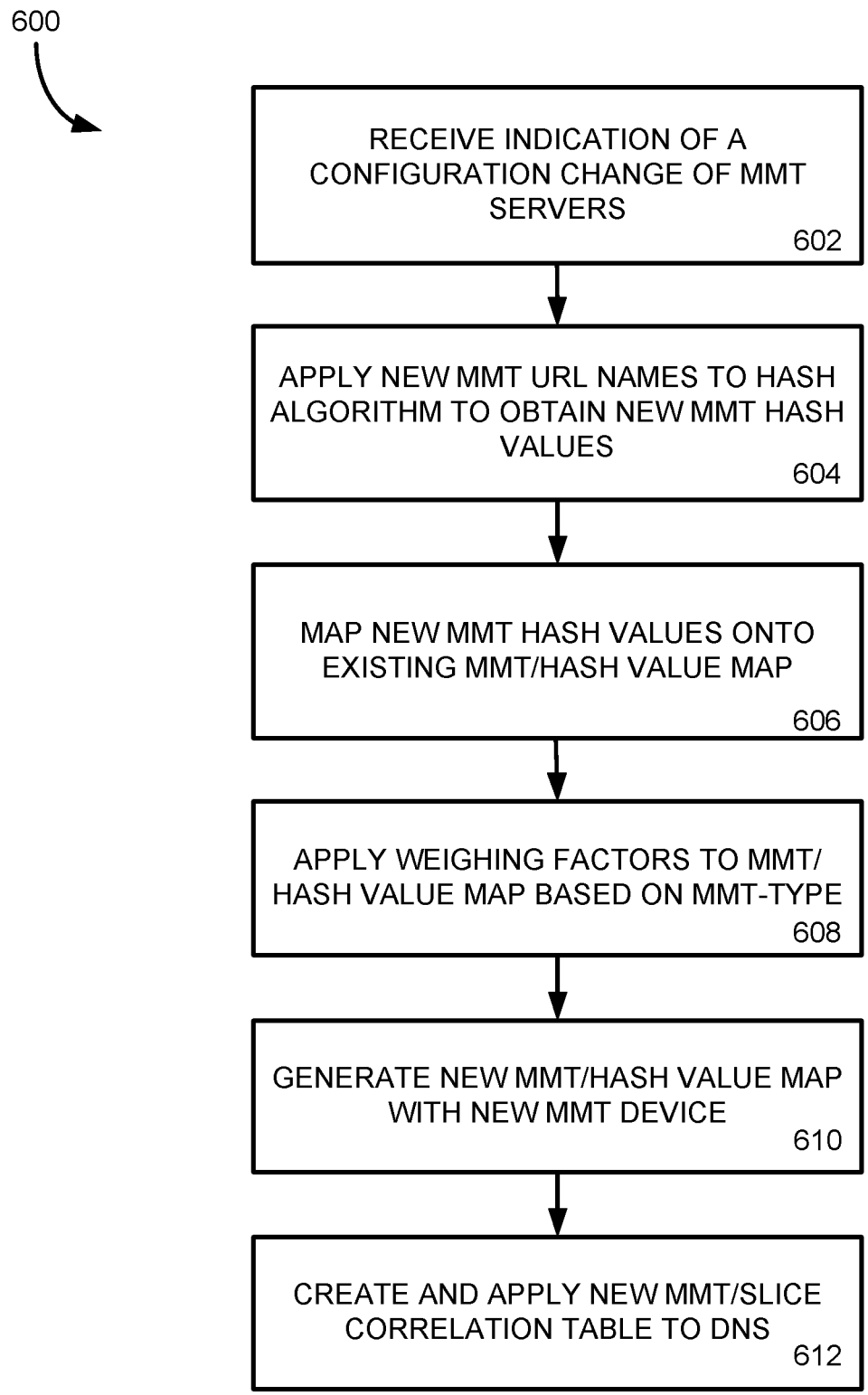
FIG. 6 is a flowchart of a method for updating a Domain Name Server with additional metro mid-tier Internet Protocol addresses corresponding to expand the storage capacity of a Content Delivery Network.

FIG. 6 is a flowchart of a method for updating a DNS 126 with additional MMT IP addresses corresponding to expand the storage capacity of the CDN 104. The operations of the method 600 may be performed by components of the CDN 104 or associated with the CDN when additional MMT devices are added to a metro or, in some cases, when MMT devices are removed from the metro. Thus, any change to the configuration of the MMT devices 112-116 of the metro CDN 104 may trigger the execution of the method 600.

Beginning in operation 602, the CDN 104 may receive an indication of a change to the MMT device configuration of the metro CDN. In one particular example, the configuration change includes increasing the number of MMT devices 112-116 of the metro. In another example, the configuration change includes removing one or more MMT devices from service, including when a MMT device 112-116 fails and no longer communicates with the rest of the network. In some implementations, the indication of the configuration change is received from a network administrator providing one or more components of the CDN 104 information about the new configuration. In other implementations, the CDN 104 may receive device information when the new devices are included in the network and announce their presence or when removed devices cease announcing device information.

Regardless of the type of configuration change of the MMT devices 112-116 or how the indication of the change is received, the CDN 104 may obtain a URL of the new MMT device and apply the new MMT URL to the hashing algorithm in a similar manner as discussed above. Through the application of the MMT device URL to the hashing algorithm, a new MMT hash value is obtained. In a particular instance discussed above, the CDN 104 may generate many hash values associated with a particular MMT device, such as 100 different hash values by altering the URL in a consistent manner. In operation 606, the CDN 104 may then apply the new MMT hash values to an existing MMT device/hash value map, similar to the MMT device/hash value map 500 of FIG. 5. These new MMT hash values are mapped onto the MMT device/hash value map 500 in conjunction with the already mapped MMT values. However, the CDN 104 may then assign a portion of existing regions to the new MMT device based on the application of the new MMT hash values, as discussed more below.

In addition, the process 600 also allows for applying one or more weighting factors to the application of MMT hash values to the MMT device/hash value map in operation 608. For example, some MMT devices operate faster or have a larger storage capacity. In one particular configuration, a first version of an MMT device may include up to 12 storage servers while a second version of an MMT device may provide half the storage capacity on a single storage server. In other words, two second version MMT devices may equate to one first version MMT device (comprising 12 storage servers). In such an example, a weight of two may be applied to first version MMT devices while second version MMT devices receive a weight of one in operation 608. Through the application of the weighting factors, first version MMT devices may receive twice as many hash entries on the MMT device/hash value map 500 than second version MMT devices (as second version MMT devices equate to half the capacity of the first version MMT devices). As should be appreciated, these weighing factors may be a value to account for the different capabilities and storage capacities of the various MMT devices utilized within the CDN 104.

In operation 610, a new MMT device/hash value map 500 is generated that includes regions for the new MMT device and accounts for any weighing factors applied. Because each MMT device has multiple, non-contiguous regions of the MMT device/hash value map 500 assigned to it, the impact of assigning portions of regions to a new MMT device on any one existing MMT device is minimized. In other words, the CDN 104 applies the new MMT hash values to the MMT device/hash value map 500 and assigns regions of values to the new MMT device. Although some existing MMT devices may forfeit portions of some regions, other regions of the MMT device/hash value map 500 for the existing MMT devices remain intact. Thus, the impact of ceding portions of previously assigned number regions to the new MMT device may not impact any particular existing MMT device disproportionally. In this manner, MMT devices that have stored particular content may likely retain the requests for that content, while the new MMT device is more likely to be responsible for storing only a small fraction of content from any existing MMT device. As such, the impact on the storage profile of the MMT devices is minimized so that the CDN 104 may operate efficiently and with little slowdown.

With the new MMT device added to the MMT device/hash value map 500, the CDN 104 may create a new MMT/slice correlation table as described above and apply the table to the DNS 126 in operation 612. In this manner, changes to the configuration of MMT devices 112-116 may be automatically included in the DNS 126 for use in fulfilling requests for content. In particular, slices utilized by the CDN 104 may be automatically mapped to the new MMT device for use in the metro and the DNS 126 may be updated automatically to resolve requests based on those slices. In the case where MMT devices are reduced, the process 600 provides for the slices to be distributed across the existing MMT devices and the DNS 126 updated to reflect the CDN configuration change. Because such changes to the distribution of slices on the MMT devices 112-116 occur automatically by the CDN 104, the operation and control of the CDN may occur more efficiently and with less opportunity for human errors.

FIG. 7 is a block diagram illustrating an example of a computing device or computer system 700 which may be used in implementing the embodiments of the components of the network disclosed above. For example, the computing system 700 of FIG. 7 may be the DNS proxy server discussed above. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 714 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 740, as illustrated.

I/O device 740 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

I claim:

1. A content delivery network comprising:
   a first device having a processor in communication with a non-transitory storage medium having computer executable instructions stored therein, the computer executable instructions configured to:
      in response to receiving a content request for content from an edge device unable to serve the content, generate an identification of an intermediate tier content device to obtain the content, the generation of the identification of the intermediate tier content device based on application of a hash algorithm to the content request,
      hash a first uniform resource locator included in the content request to obtain a first hash value, and
      using the first hash value, obtain a second uniform resource locator associated with a specific mid-tier server to request the content;
   a domain name server that provides an internet protocol (IP) address of the intermediate tier content device using the second uniform resource locator, wherein the domain name server is configured based on a map that correlates a second hash of the second uniform resource locator, a hash of a third uniform resource locator associated with a hostname of the content delivery network, and the IP address of the intermediate tier content device; and the intermediate tier content device serving the content.

2. The content delivery network of claim 1 wherein to obtain a second uniform resource locator associated with a specific mid-tier server to request the content, the computer executable instructions are further configured to access a first hash map that correlates hash values with intermediate tier content devices, the first hash map including a first correlation of the first hash value and the second uniform resource locator for the specific mid-tier server.

3. The content delivery network of claim 1 wherein the first uniform resource locator includes an identification of the content.

4. The content delivery network of claim 1 wherein the first hash map includes a plurality of correlations between a plurality of hash values and the second uniform resource locator of the intermediate tier device, the plurality of hash values including the hash value.

5. A content delivery method comprising:
   in response to receiving a content request for content from an edge device unable to serve the content, generating an identification of an intermediate tier content device to obtain the content, the generation of the identification of the intermediate tier content device based on application of a hash algorithm to the content request;
   hashing a first uniform resource locator included in the content request to obtain a first hash value,
   using the first hash value, obtaining a second uniform resource locator associated with a specific mid-tier server to request the content;
   providing, by a domain name server, an internet protocol (IP) address of the intermediate tier content device using the second uniform resource locator, wherein the domain name server is configured based on a map that correlates a second hash of the second uniform resource locator, a hash of a third uniform resource locator associated with a hostname of a content delivery network, and the IP address of the intermediate tier content device; and
   serving the content from the intermediate tier content device.

6. The content delivery method of claim 5 wherein obtaining the second uniform resource locator associated with a specific mid-tier server to request the content comprises accessing a first hash map that correlates hash values with intermediate tier content devices, the first hash map including a first correlation of the first hash value and the second uniform resource locator for the specific mid-tier server.

7. The content delivery method of claim 5 wherein the first uniform resource locator includes an identification of the content.

8. The content delivery method of claim 5 wherein the first hash map includes a plurality of correlations between a plurality of hash values and the second uniform resource locator of the intermediate tier device, the plurality of hash values including the hash value.

9. The content delivery method of claim 5 further comprising:
   hashing the second uniform resource locator to obtain a second hash value;
   associating the second hash value to a particular value region of a second hash map, the particular value region of a plurality of value regions, the particular value region associated with the intermediate tier content device;
   hashing a third uniform resource locator associated with the hostname of the content delivery network to obtain a hostname URL hash value, the hostname URL hash value within the particular value region of the second hash map;
   correlating the hostname URL hash value to the particular value region and to the intermediate tier content device; and
   configuring the domain name service to return the IP address of the intermediate tier content device when receiving a request comprising the hostname of the CDN.

10. The method of claim 9 wherein a subset of the plurality of value regions are associated with the intermediate tier content device, the subset of the plurality of value regions based at least on a weighing factor.

11. The method of claim 10 wherein the weighing factor corresponds to a performance characteristic of the intermediate tier content device.

* * * * *